US006196457B1

(12) United States Patent
Patterson

(10) Patent No.: US 6,196,457 B1
(45) Date of Patent: Mar. 6, 2001

(54) SHEET DISPENSING MECHANISM

(75) Inventor: David L. Patterson, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/324,629

(22) Filed: Jun. 2, 1999

(30) Foreign Application Priority Data

Jun. 16, 1998 (GB) .................................................. 9812841

(51) Int. Cl.[7] ...................................................... G06F 17/06

(52) U.S. Cl. .............................. 235/379; 902/14; 902/15; 902/17

(58) Field of Search .............................. 235/379; 901/12, 901/13, 14, 15, 16, 17

(56) References Cited

U.S. PATENT DOCUMENTS 4,676,432 * 6/1987 Wake .................................. 232/43.2

FOREIGN PATENT DOCUMENTS 0367519 5/1990 (EP) .
2106687 4/1983 (GB) .

* cited by examiner

*Primary Examiner*—Karl D. Frech

(57) ABSTRACT

A cash dispensing mechanism of an automated teller machine (ATM) includes a safe inside which are housed first and second units. The first unit includes currency cassettes and an associated pick mechanism. Bills are transported from the pick mechanism to a bill validator included in the first unit. If a bill is rejected then a divert gate directs it into a purge bin also included in the first unit. The second unit is mounted on the first unit with a selected orientation relative to said first unit dependent on whether the cash dispensing mechanism has a front loading or a rear loading configuration. Bills accepted by the validator are transported upwardly out of the first unit and into the second unit via a single transfer station, regardless of whether the cash dispensing mechanism has a front or rear loading configuration. The second unit stacks bills received from the first unit into a bunch and transports the bunch to a bill dispensing port of the safe.

16 Claims, 9 Drawing Sheets

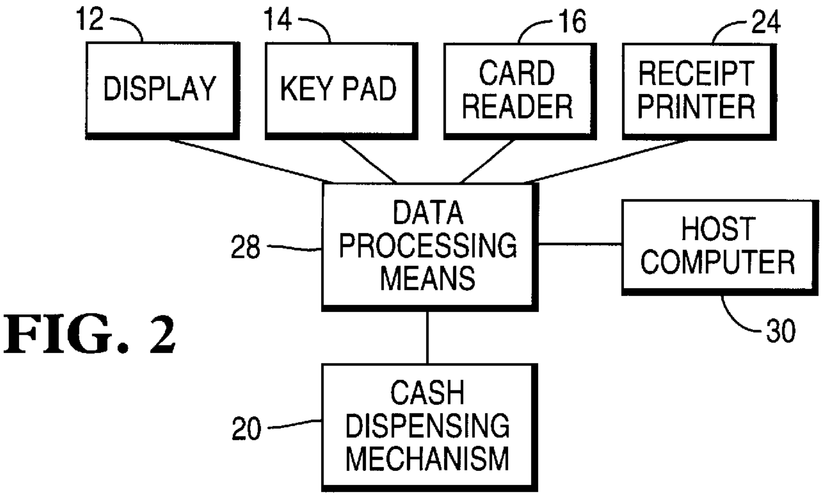
FIG. 2
FIG. 3
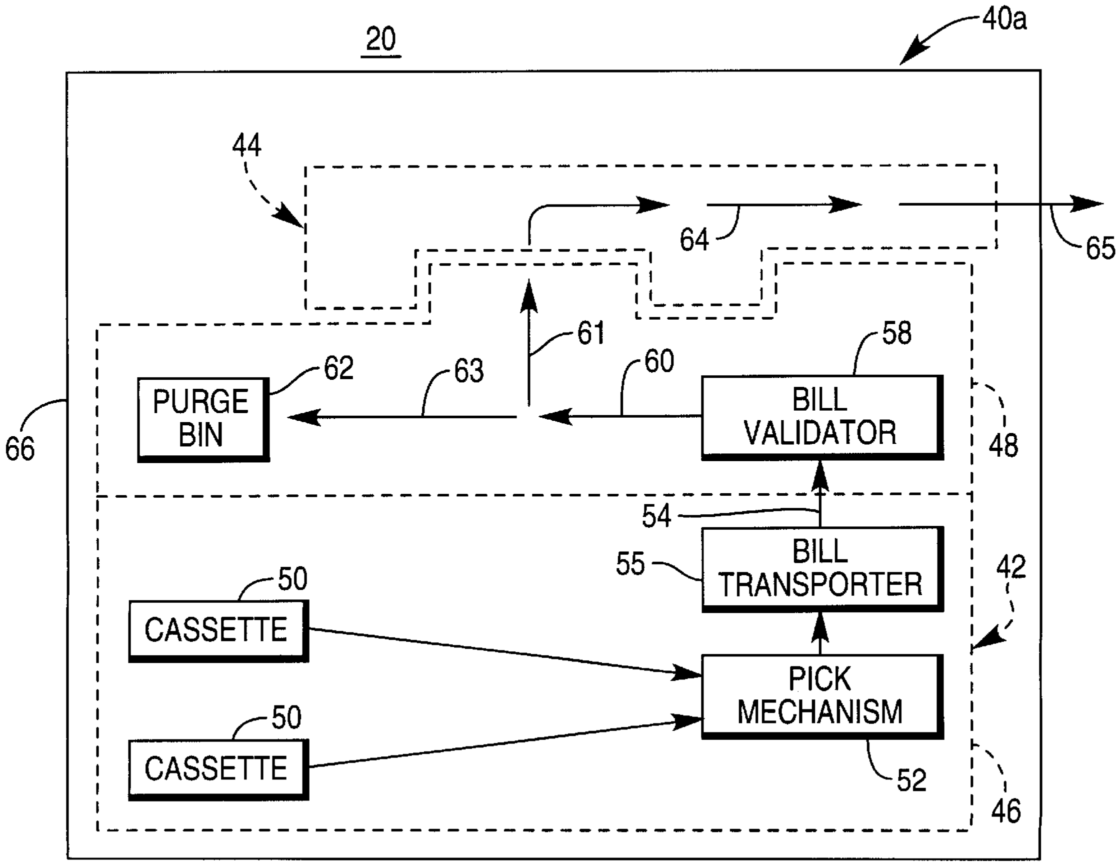

SHEET DISPENSING MECHANISM

BACKGROUND OF THE INVENTION

The present invention relates to a sheet dispensing mechanism.

The invention has application, for example, to a cash dispensing mechanism of an automated teller machine (ATM). An ATM has a user console to allow a customer to operate the machine. The cash dispensing mechanism typically includes at least one bill picking mechanism for extracting bills one by one from an associated currency cassette, and a presenting mechanism for presenting bills to an exit slot in the ATM.

A cash dispensing mechanism of an ATM may be of the rear loading type in which currency cassettes are removed from, and replaced in, the dispensing mechanism from the rear of the ATM, that is on the side opposite the user console, or it may be of the front loading type in which currency cassettes are removed from, and replaced in, the dispensing mechanism from the front of the ATM. Normally, a through-the-wall ATM, in which the user console is mounted in a wall of a bank or other building, includes a cash dispensing mechanism of the rear loading type, while an in-lobby ATM located inside a bank or other building may include a cash dispensing mechanism of either the rear loading or front loading type.

The present application has particular application to a dispensing mechanism of an ATM which is of the type that delivers a stack or bunch of bills to a user (known as a bunch dispenser).

From U.K. Patent Application 2106687A there is known a cash dispensing mechanism which can be modified so as to have either a front loading or a rear loading configuration. This known mechanism comprises upper and lower units, the upper unit housing stacking means and transport means for feeding a stack of currency bills to an exit port and for feeding rejected bills to a rejected bill container positioned at the rear of the mechanism, and the lower unit housing currency bill dispensing compartments and transport means for feeding bills to the upper unit. The whole of the lower unit is rotatable through 180° with respect to the upper unit during installation, whereby the installed cash dispenser unit can be either front loading or rear loading. This arrangement has the potential advantage of increasing the manufacturer's productivity, since it is not necessary to manufacture two different types of cash dispensing mechanisms for front loading and rear loading operations. However, this known cash dispensing mechanism has the disadvantage that complexities are introduced due to the fact that transfer of bills from the lower unit to the upper unit takes place at one or other of two separate transfer stations, depending on whether the mechanism has a front loading or a rear loading configuration. For example, adjustable divert means are required, such divert means being liable to give rise to the jamming of the bills.

SUMMARY OF THE INVENTION

It is an object of the present invention to provide a bunch dispensing mechanism which can have either a front loading or a rear loading configuration and which is of simple construction.

According to the present invention there is provided a sheet dispensing mechanism including a housing having a sheet dispensing port via which sheets are dispensed to a user of the mechanism, a first unit mounted inside said housing including removable sheet storage means, picking means for picking sheets one by one from said sheet storage means, and first transport means for transporting sheets from said picking means, and a second unit which is mounted on said first unit within said housing with a selected orientation relative to said first unit dependent on whether said dispensing mechanism has a front loading or a rear loading configuration, said second unit being arranged to receive sheets transported upwardly out of said first unit, and including second transport means for transporting individual sheets received from said first unit to stacking means where the sheets are stacked into a bunch, and further including bunch transport means for transporting said bunch of sheets from said stacking means to said sheet dispensing port through which the bunch is presented for collection by a user, characterized in that said first unit further includes sheet checking means through which sheets transported from said picking means by said first transport means are passed, divert means for directing sheets rejected by sheet checking means into reject means, and third transport means for transporting sheets accepted by said sheet checking means upwardly out of said first unit to said second unit at a single transfer station, regardless of whether said dispensing mechanism has a front or rear loading configuration.

BRIEF DESCRIPTION OF THE DRAWINGS

Embodiments of the present invention will now be described by way of example with reference to accompanying drawings, in which:

FIG. 2 a block diagram representation of the ATM of FIG. 1;

FIG. 3. is a schematic representation of a cash dispensing mechanism having a rear loading configuration;

DETAILED DESCRIPTION

Figure 1:
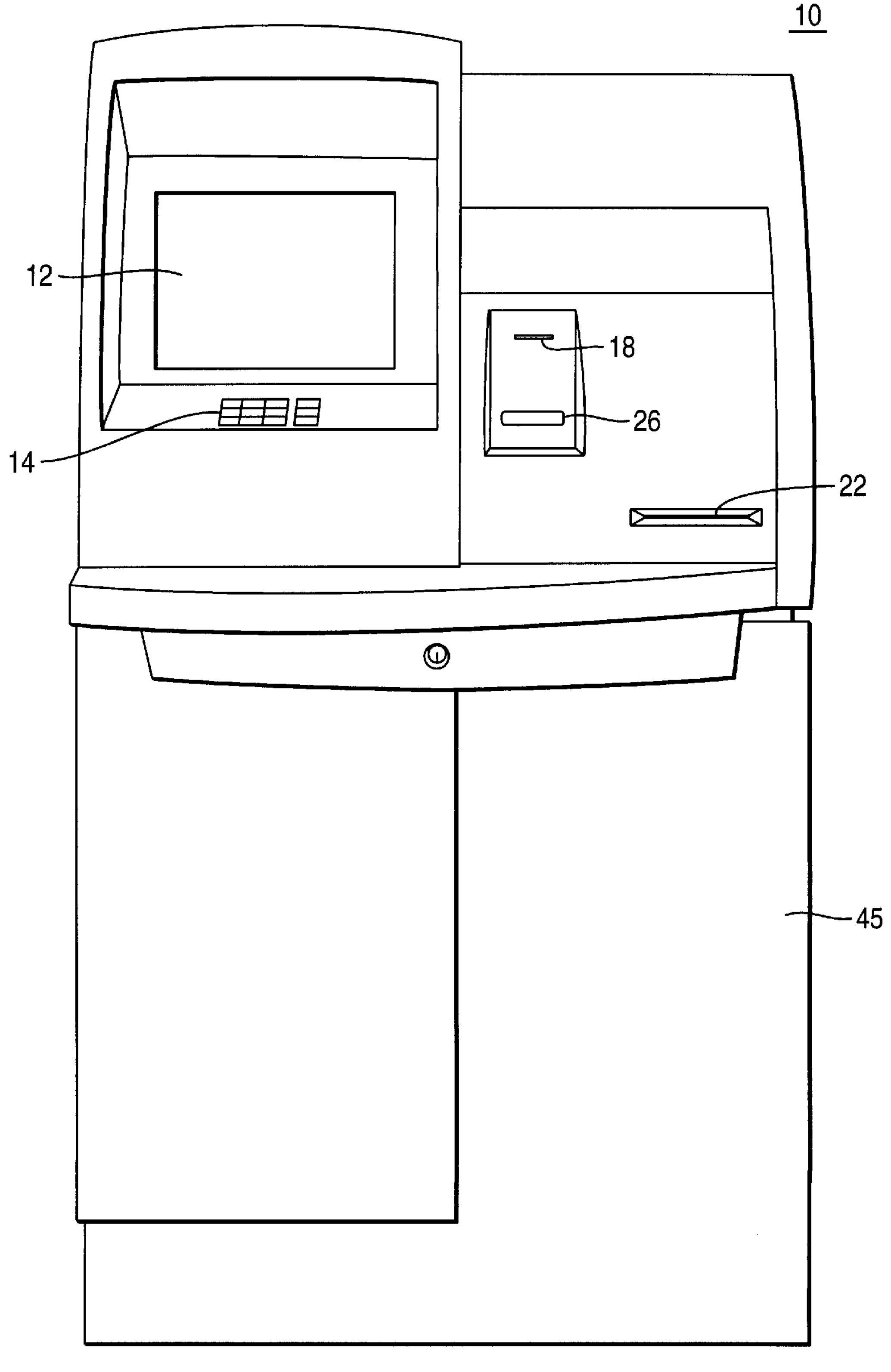
FIG. 1 is a perspective view of an in-lobby ATM adapted to include a dispensing mechanism in accordance with the invention.

Referring first to FIGS. 1 and 2, an ATM 10 comprises a display 12 for displaying user information, a key pad 14 for inputting data, a card reader 16 for receiving a user identity card via a card slot 18, a cash dispensing mechanism 20 for dispensing currency bills stored in the mechanism 20 to a user during a transaction via a slot 22, a receipt printer 24 for printing a receipt acknowledging a transaction made by a user and for issuing the receipt to the user via a slot 26, and data processing means 28 to which the display 12, the key pad 14, the card reader 16, the cash dispensing mechanism 20 and the receipt printer 24 are connected.

To make a withdrawal, a user inserts his identification card in the card slot 18 of the ATM 10. Data contained in a magnetic strip on the card is read by the card reader 16 and transmitted by the data processing means 28 to a host computer 30. The user identifies himself by entering his personal identity number via the key pad 14. If the host computer 30 authorizes the card then the user can proceed with his withdrawal by first entering details of the transaction, e.g. the amount of the withdrawal by means of the key pad 14.

Referring now to FIG. 3, a cash dispensing mechanism 20 having a rear loading configuration is shown. This cash dispensing mechanism 20 comprises a safe 40*a* inside which are housed a lower unit 42 and an upper unit 44. The safe 40*a* is mounted in a housing 45 (see FIG. 1) of the ATM 10. The lower unit 42 has lower and upper sections 46,48. Inside the lower section 46 of the lower unit 42 are mounted currency cassettes 50 which are associated with a conventional pick mechanism 52. It should be understood that the upper unit 44 is mounted on the lower unit 42 with a selected orientation relative to the lower unit 42 determined by the fact that the cash dispensing mechanism 20 has a rear loading configuration.

When a request for a cash withdrawal is made and approved, the data processing means 28 (see FIG. 2) causes the pick mechanism 52 to pick bills in a known manner from at least one cassette 50. Each bill is picked singly and the bills are individually passed along a feed path (indicated by arrow 54) by conventional bill transport means 55 included in the lower section 46. The feed path takes the bill from the lower section 46 to a conventional bill validator 58 in the upper section 48. If the bill validator 58 accepts the bill then the bill is first transported along a horizontal feed path 60 and is then transported vertically out of the lower unit 42 and into the upper unit 44 along a feed path 61. If the validator 58 does not accept the bill (e.g. if the bill is a multiple bill) then the bill is rejected and directed into a purge bin 62 via a horizontal feed path 63 which is a continuation of the feed path 60. The bills transported vertically out of the lower unit 42 are transported through the upper unit 44 via a feed path 64 where the bills are delivered to the user via a slot 65 in the safe 40*a* and via the delivery slot 22 (see FIG. 1) in the housing of the ATM 10. As will be explained in more detail later, depending on the configuration of the upper unit 44, the bills are either stacked and delivered to the user as a bunch, or are delivered to the user one by one.

The safe 40*a* has a door 66 on its rear side (i.e. the side opposite the front of the ATM 10) for enabling access to the currency cassettes 50 and the purge bin 62.

Figure 4:
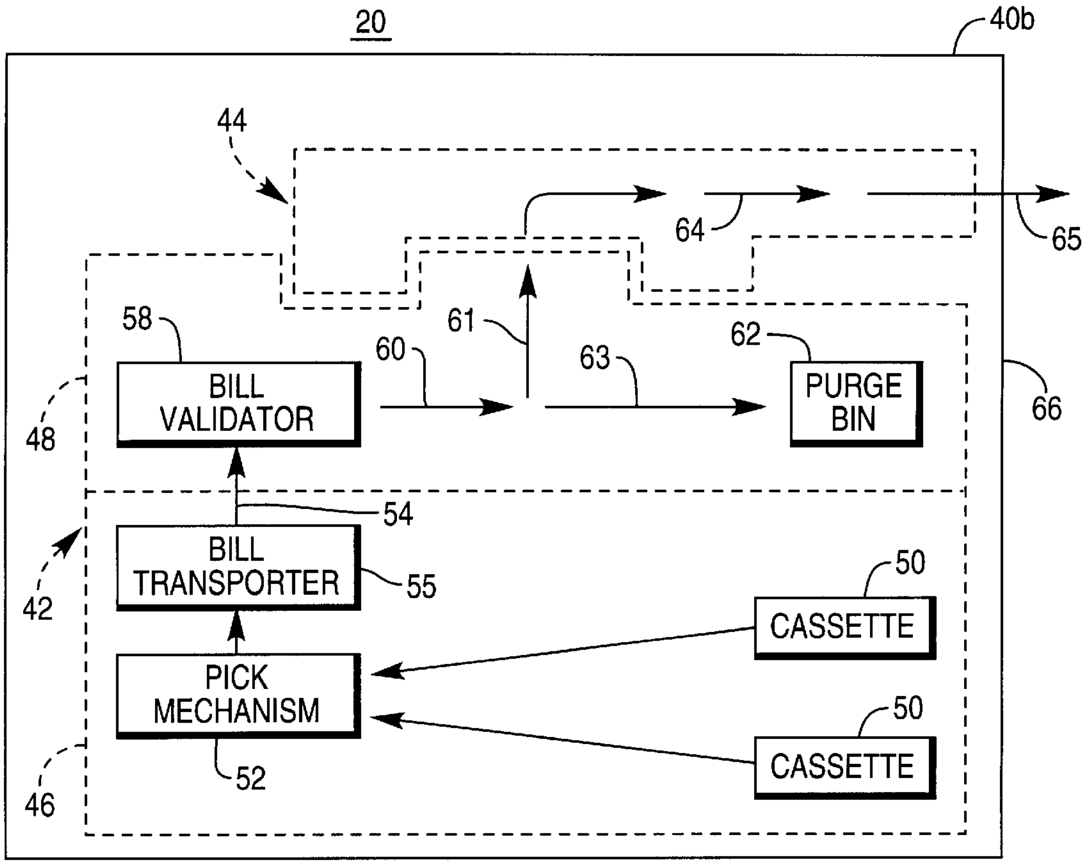
FIG. 4 is a schematic representation of a cash dispensing mechanism having a front loading configuration.

Referring to FIG. 4, a cash dispensing mechanism 20 having a front loading configuration is shown. The construction of this front loading mechanism 20 is the same as that of the rear loading mechanism 20 shown in FIG. 3, except for the following differences. Firstly, the upper unit 44 is mounted on the lower unit 42 with an orientation which is rotated through 180° in relation to the first orientation shown in FIG. 3. Secondly, the door 66 of the safe 40*b* for enabling access to cassettes 50 and the purge bin 60 is on the front side of the safe 40*b*(i.e. the side corresponding to the front of the ATM 10), and the exit slot 65 is in the door 66.

Figure 5:
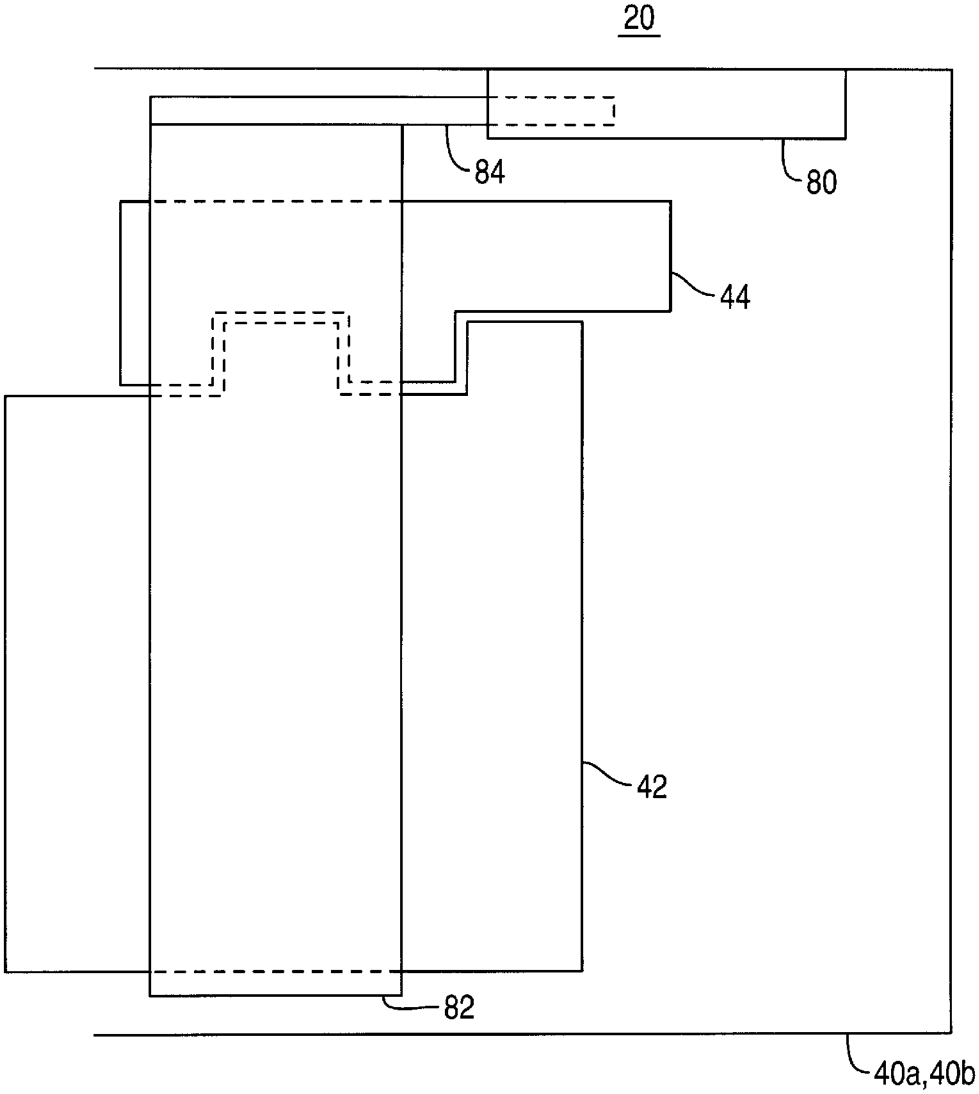
FIG. 5 is a schematic representation showing a stage in the assembly of the cash dispensing mechanism of FIG. 3 or FIG. 4.

Referring to FIG. 5, it is shown how the assembly of the lower and upper units 42,44 can racked in or out of the safe 40*a* or 40*b*. A cradle 80 is fixed to the underside of the roof of the safe 40*a* or 40*b*. The assembly of the lower and upper units 42,44 is held in a conventional supporting framework 82. Two slides 84 respectively provided on the sides of the framework 82 respectively slidably engage in two channels respectively provided in the cradle 80, whereby the assembly 42,44 can be slid into or out of the safe 40*a* or 40*b*.

Figure 6:
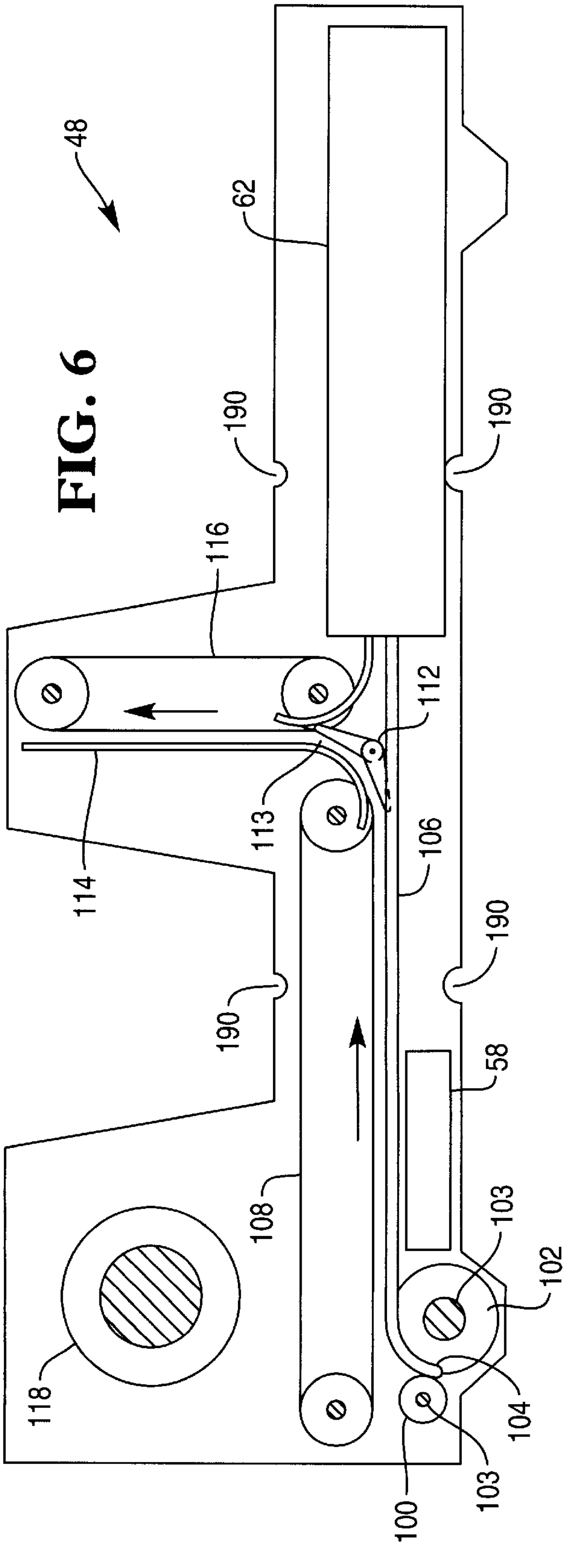
FIG. 6 is a part sectional side elevational view of a core module of a cash dispensing mechanism of either FIG. 3 or FIG. 4.

Referring to FIG. 6, the upper section 48 of the lower unit 42 is shown in detail. This upper section 48 will hereinafter be referred to as the core module 48.

The core module 48 includes a pair of cooperating roller units 100,102 each comprising a series of individual rollers spaced along a respective shaft 103. The pair of roller units 100,102 receive and feed bills which have been transported upwardly from the lower section 46 by the transport means 55. Curved end sections 104 of a horizontal skid plate 106 are interspersed with the individual rollers of the roller unit 102. The leading edge of each bill which is received and fed by the roller units 100,102 of the core module 48 is guided by guide means (not shown) into contact with a belt unit 108 which is disposed immediately above, and in cooperative engagement with, the skid plate 106. The bill is then pressed against the skid plate 106 by the belt unit 108 and is transported by the belt unit 108 past the conventional bill validator 58 to a known two position divert gate 112. If the bill is accepted by the validator 58, then the divert gate 112 directs the bill into the entry throat 113 of a further transport means comprising a vertically extending skid plate 114 and a belt unit 116 which is in cooperative engagement with the skid plate 114. The belt unit 116 presses the bill against the skid plate 114 and transports the bill upwardly out of the unit 42 and into the unit 44. If the bill is not accepted by the validator 58 then it is directed by the divert gate 112, under the control of the data processing means 28, into the purge bin 62. The belt unit 116 runs slightly faster than the belt unit 108 to aid the bill change its direction of transport. Both belt units 108,116 are driven by a reversible DC motor 118 operation of which is controlled by the data processing means 28. It should be understood that each of the belt units 108,116 comprises a plurality of endless belts extending around two sets of support pulleys, the pulleys of each set being spaced apart along a common shaft. One set of pulleys of each belt unit 108 or 116 serve as drive pulleys for that belt unit.

If there is a power failure while a bill is present between the vertical skid plate 114 and the belt unit 116, then the divert gate 112 can be set to direct the bill into the purge bin 60 when power is restored.

Figure 7:
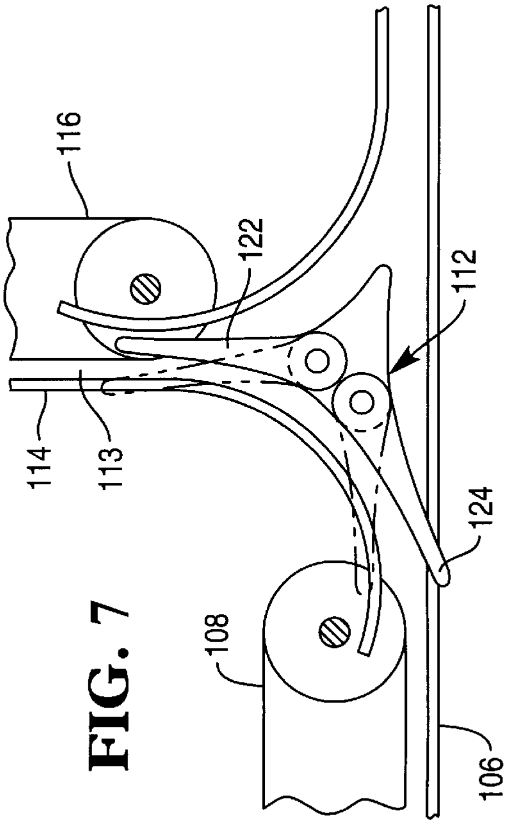
FIG. 7 is a enlarged side elevational view of a two position divert gate used in the core module of FIG. 6.

Referring to FIG. 7, the two position divert gate 112 comprises two flippers 122,124 which are in the positions shown in solid outline when the gate 112 is set to direct bills from the horizontal skid plate 106 and belt unit 108 to the vertical skid plate 114 and belt unit 116. The flippers 122,124 are shown in the positions shown in chain outline when the gate 112 is set to direct a bill into the purge bin 60, either from the transport means comprising the horizontal skid plate 106 and the belt unit 108, or from the transport means comprising the vertical skid plate 114 and the belt unit 116.

Figure 8:
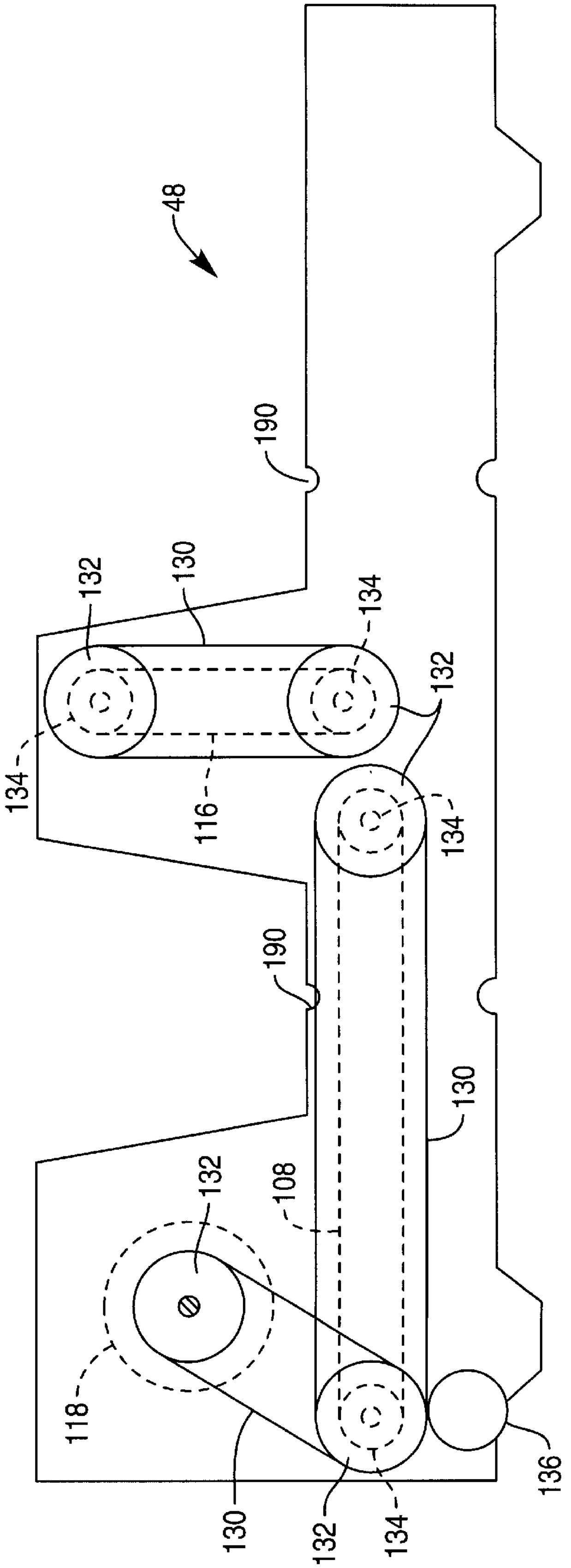
FIG. 8 is a further side elevational view of the core module of FIG. 6, additionally showing part the drive mechanism for the core module.

Referring to FIG. 8, drive for the belt units 108,116 is provided by the motor 118 via timing belts 130 which are mounted around, and are supported by, gear wheels 132. The gear wheels 132 are respectively mounted on the shaft of the motor 118 and on the shafts on which the support pulleys 134 of the belt units 108,116 are mounted. Timing belts are known types of belts which have grooves on them which prevent slipping and which engage with the teeth of the associated gear wheels. Thus, one timing belt 130 transmits drive from the motor 118 to drive pulleys 134 at one end of first belt unit 108. A second timing belt 130 connects together the two gear wheels 132 respectively associated with the two ends of the first belt unit 108. A third timing belt 130 connects together the two gear wheels 132 respectively associated with the two ends of the second belt unit 116. Drive from the timing belt and gear system associated with the belt unit 108 is transmitted to the timing belt and gear system associated with the belt unit 116 via further gears (not shown), whereby, as previously mentioned, the belt unit 116 is driven at a somewhat higher speed than the belt unit 108. A gear system which includes an idler gear 136 and which is operatively coupled to the timing belt and gear system associated with the belt unit 108 enables the motor 118 to drive the pick mechanism 52 in the lower section 46 of the lower unit 42 of the cash dispenser mechanism 20. Another gear system which includes an idler gear (not shown) and which is operatively coupled to the timing belt and gear system associated with the belt unit 116 serves to drive part of the upper unit 44.

The core module 48 has been described as a separate unit and can be separately manufactured from the rest of the lower unit 42 before being attached to it. Alternatively, the whole lower unit 42 incorporating the features of the core module 48 could be manufactured as one complete unit.

Figure 9:
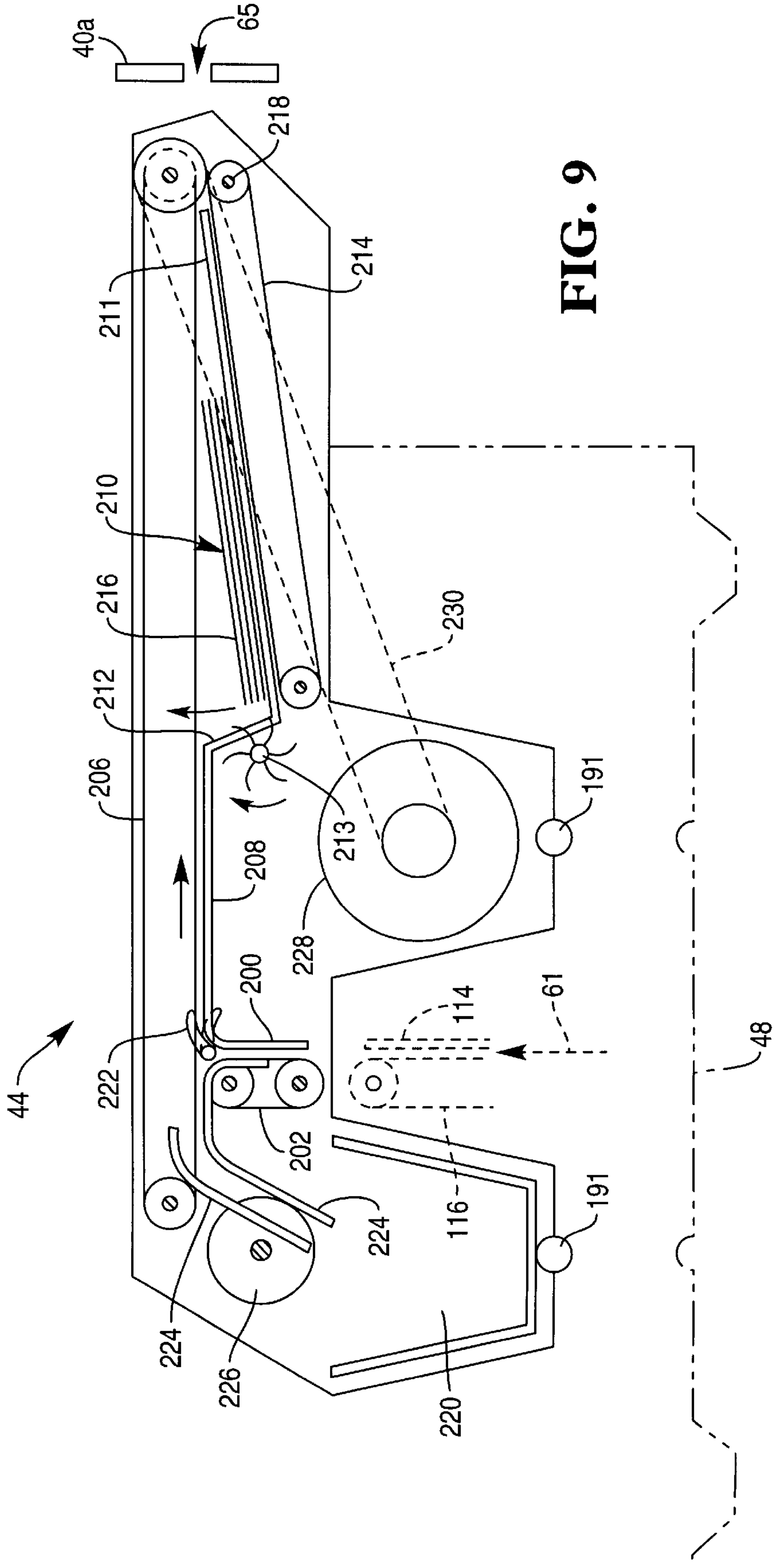
FIG. 9 is a part sectional side elevational view of a bunch dispensing upper unit of the rear loading cash dispensing mechanism of FIG. 3.

Referring to FIG. 9, the upper unit 44 of a rear loading bunch dispensing cash dispensing mechanism 20 is shown in detail. The outline of the core module 48 below has been shown in chain outline for clarity.

This upper unit 44 includes a vertical skid plate 200 and a cooperating belt unit 202 which is similar in construction to the belt unit 116. Individual bills which are transported upwardly from the core module 48 to the upper unit 44 are received between the skid plate 200 and the belt unit 202 and are fed upwardly by the belt unit 202. The leading edge of a bill fed upwardly by the belt unit 202 makes contact with a horizontally extending belt unit 206 which is disposed immediately above the upper end of the belt unit 202. The belt unit 206 is driven at a slightly faster speed than the belt unit 202 in order to assist in changing the direction of travel of the bill. The bill is pressed by the belt unit 206 against a cooperating horizontally extending skid plate 208, and is fed by the belt unit 206 into a known stacking unit 210. The stacking unit 210 includes a support plate 211 which slopes downwardly from a position adjacent the slot 65 in the safe 40*a* to stop members 212 which extend downwardly from, and are integral with, that end of the skid plate 208 remote from the vertically extending skid plate 200. Conventional flexible strap flicker wheels 213 are used to push transported bills down onto the support plate 211, the straps of the flicker wheels 213 extending through slots (not seen) formed in the skid plate 208 and stop members 212. The stacking unit 210 also includes a pivotally mounted belt unit 214 which in its normal rest position is positioned immediately below, and extends parallel to, the support plate 211. Once the required bunch of bills 216 has been stacked on the support plate 211, the belt unit 214 is pivoted in a clockwise sense (with reference to FIG. 9) about a shaft 218 so as to lift the bunch of bills 216 off the plate 211 and bring the bunch 216 into contact with the belt unit 206. It should be understood that the belt unit 214 includes a plurality of separate endless belts which are spaced apart in a direction parallel to the shaft 218 and which during the pivotal movement of the unit 214 pass through slots (not seen) formed in the support plate 211. The cooperating belt units 206,214 then transport the bunch 216 to the slot 65 in the safe 40*a*, the bunch 216 being presented to the user of the ATM 10 via the aligned exit slot 22 (FIG. 1) in the housing 45 of the ATM 10. As in the case of the spray dispensing cash dispensing mechanisms previously described, a conventional shutter means (not shown) controlled by the data processing means 28 blocks the exit slot 22 when bills are not being presented to a user.

If the bunch of bills 216 presented to the user is not taken by the user in a predetermined short period of time then the second and third belt units 206,214 are reversed and the bunch 216 is withdrawn back into the upper unit 44 of the cash dispensing mechanism 20 and is diverted into a purge bin 220. A divert gate 222 is activated to ensure that the bunch 216 is directed into the purge bin 220 and not back into the core module 48 below. The normal, inactivated position of the divert gate 222 is shown in solid outline, and its activated position is shown in chain outline. Guides 224 and a foam roller 226 direct bills into the purge bin 220.

The belt unit 206 of the upper unit 44 shown in FIG. 9 is driven by a motor 228 in the upper unit 44 via a timing belt 230 (shown in chain outline) and gear wheels (not shown) which are respectively operatively associated with the motor 228 and the drive pulley set of the belt unit 206. The motor 228 is also used to drive the flicker wheels 212 in a known manner. The belt unit 202 is driven from the DC motor 118 of the core module 48 via an idler gear (not shown). Drive to the belt unit 214 is transmitted from the belt unit 206 via gear means (not shown), but separate actuating means are provided to pivot the belt unit 214. The motor 228, and the actuating means for the belt unit 214 and the divert gate 222 are all under the control of the data processing means 28 of the ATM 10.

Figure 10:
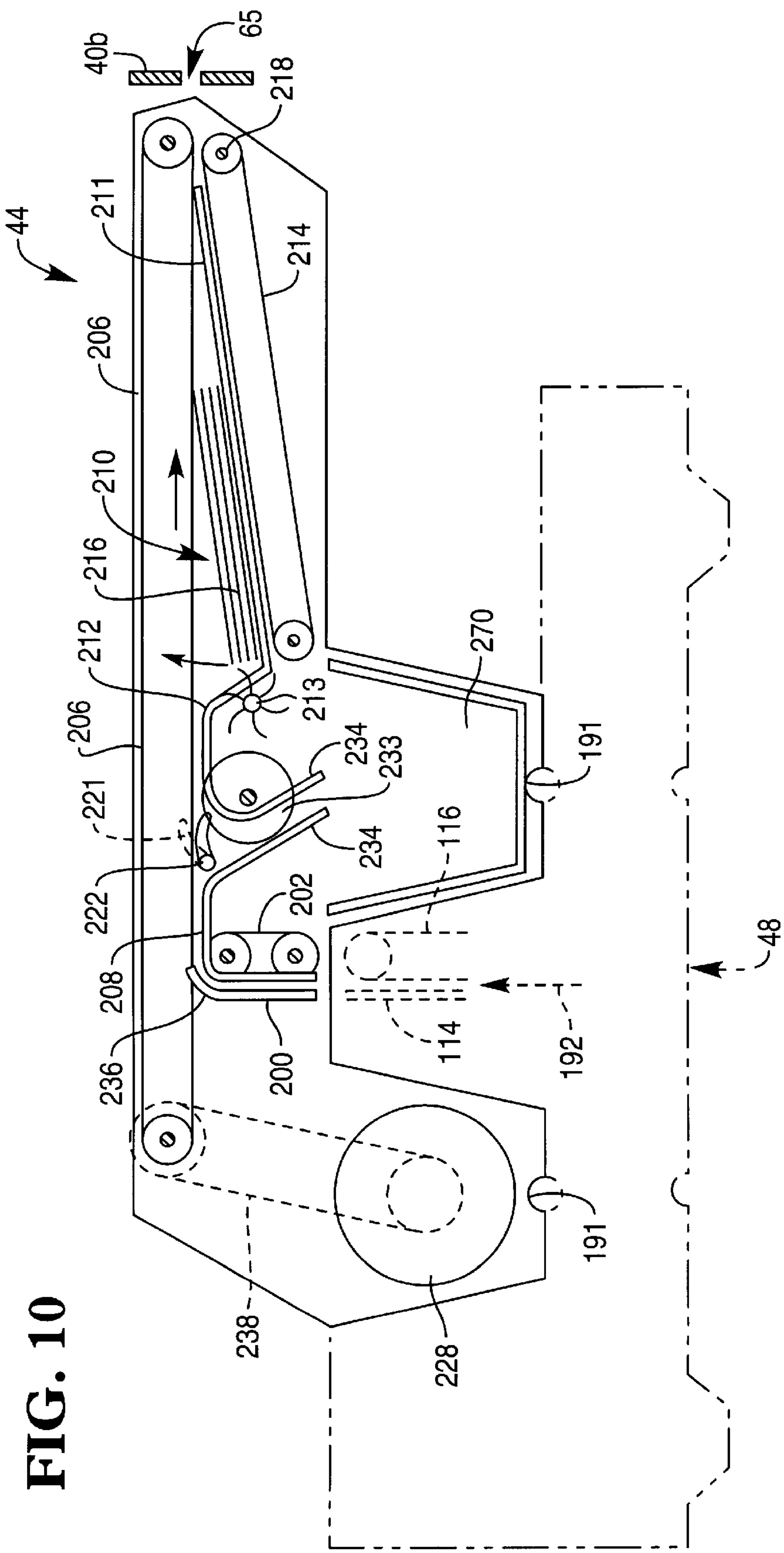
FIG. 10 is a part sectional side elevational view of a bunch dispensing upper unit of the front loading cash dispensing mechanism of FIG. 4.

Referring to FIG. 10, the upper unit 44 of a front loading bunch dispensing cash dispensing mechanism 20 is shown. The main difference from the upper unit 44 shown in FIG. 9 is that the positions of the motor 228 and the purge bin 220 have been interchanged. Consequently the divert gate 222 is repositioned in a gap 232 provided in the horizontal skid plate 208 to allow a retrieved bunch of bills to be diverted into the purge bin 220 with the aid of a foam roller 233 and guides 234 formed integral with separate sections of the horizontal skid plate 208. In addition, a curved guide 236 is provided at the top of the vertical skid plate 200 to help change the direction of travel of the bills. The belt unit 206 is driven by the motor 228 via a timing belt 238.

Figure 11:
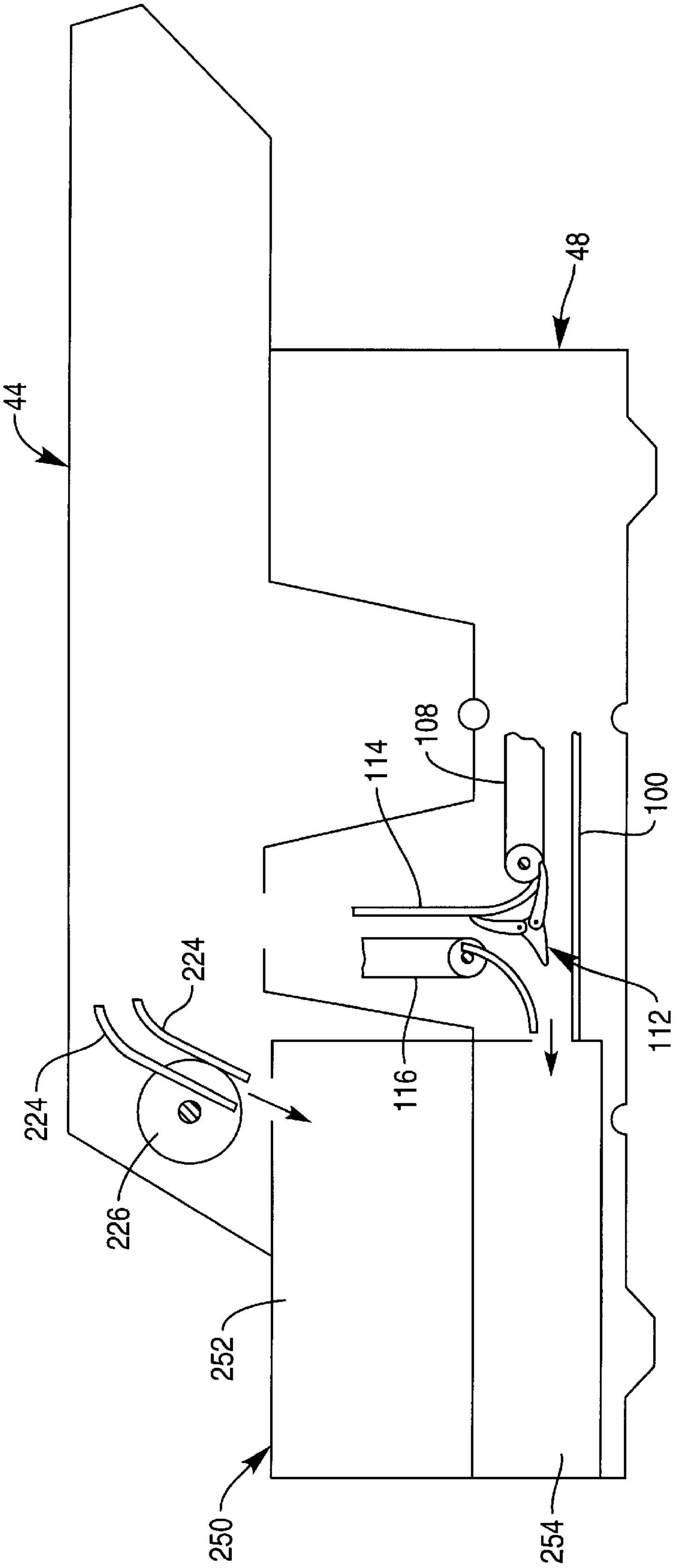
FIG. 11 is a part sectional side elevational view of part of a cash dispensing mechanism having a rear loading configuration, showing a composite purge bin.

Referring to FIG. 11 an alternative arrangement to having two separate purge bins 60,220 in a rear loading cash dispensing mechanism is shown. In this alternative arrangement, the two purge bins 60,220 are replaced by a single composite purge bin 250 divided into two compartments 252 and 254. The compartment 252 is arranged to receive untaken stacked bills, and the compartment 254 is arranged to receive rejected picked bills. The composite purge bin 250 is designed to be racked out of the cash dispensing mechanism 20 in a conventional manner so that bills can be easily removed from it.

By having either two separate purge bins 60,220 or a purge bin 250 with two compartments 252,254, reconciliation procedures are facilitated. Thus, a bank or other financial institution can tell how many bills were rejected and how many presented bills were not taken by the users of the ATM 10 within the permitted period of time.

Although the purge bin arrangement has been shown for a rear loading bunch dispensing mechanism, it could also be used for a front loading bunch dispensing mechanism.

The upper unit 44 is detachably mounted on the lower unit 42. The lower unit 42 is provided with first and second location means 190 (see FIGS. 6 and 8) which respectively cooperate with third and fourth locating means 191 (see FIGS. 9 and 10) for locating the upper unit 44 relative to the core module 48 in the supporting framework 82 (see FIG. 5). A conventional clamp (not shown) fits between each pair of cooperating locating means 190,191 to hold the lower and upper units 42,44 together. The locating means 190 and the locating means 191 are symmetrically positioned with respect to the vertical feed path 61 of bills from the lower unit 42 to the upper unit 44 so as to enable interchangeability between front and rear loading configurations.

A bunch dispensing cash dispensing mechanism in accordance with the invention has the advantage that it incorporates the same lower unit 42 regardless of whether the mechanism has a rear loading or a front loading configuration. Thus a considerable saving in manufacturing costs is achieved. Moreover, by including many standard features such as the validator 58 and the purge bin 60 in the lower unit 42, the construction of the different types of upper unit 44 is simplified. By virtue of such simplification, the upper unit of the rear loading configuration shares many similar features with an upper unit of the front loading configuration, enabling further savings in manufacturing costs to be achieved.

What is claimed is:

1. A sheet dispensing mechanism comprising:

a housing having a sheet dispensing port via which sheets are dispensed to a user;

a first unit mounted inside the housing including removable a sheet storage unit, a picking mechanism for picking sheets one by one from the sheet storage unit, and a first transport mechanism for transporting sheets from the picking mechanism; and a second unit which is mounted on the first unit within the housing with a selected orientation relative to the first unit dependent on whether the sheet dispensing mechanism has a front loading or a rear loading configuration, the second unit being arranged to receive sheets transported upwardly out of the first unit, and including a second transport mechanism for transporting individual sheets received from the first unit to a stacking mechanism where the sheets are stacked into a bunch, and further including a bunch transport mechanism for transporting the bunch of sheets from the stacking mechanism to the sheet dispensing port through which the bunch is presented for collection by a user;

the first unit including a sheet checking mechanism through which sheets transported from the picking mechanism by the first transport mechanism are passed, a first divert mechanism for directing sheets rejected by sheet checking mechanism into a first reject mechanism, and third transport mechanism for transporting sheets accepted by the sheet checking mechanism upwardly out of the first unit to the second unit at a single transfer station, regardless of whether the sheet dispensing mechanism has a front or rear loading configuration.

2. A sheet dispensing mechanism according to claim 1, wherein the third transport mechanism is arranged to transport sheets out of the first unit in a vertical direction.

3. A sheet dispensing mechanism according to claim 2, wherein (i) the first unit is provided with first and second locating means and (ii) the second unit is provided with third and fourth locating means which are arranged to cooperate with the first and second locating means for the purpose of locating the second unit relatively to the first unit, the first and second locating means and the third and fourth locating means being symmetrically positioned with respect to the vertical feed path of sheets out of the first unit.

4. A sheet dispensing mechanism according to claim 3, further comprising a second reject mechanism for receiving any presented bunch which is not taken by a user within a predetermined period of time and which is transported into the second reject mechanism by the bunch transport mechanism and the second transport mechanism.

5. A sheet dispensing mechanism according to claim 4, wherein the second unit further includes a second divert mechanism arranged to direct a bunch of sheets into the second reject mechanism.

6. A sheet dispensing mechanism according to claim 4, wherein the first and second reject mechanisms are respectively formed by compartments of a simple, composite reject mechanism which is detachable from the sheet dispensing mechanism.

7. A sheet dispensing mechanism according to claim 1, wherein the second unit is detachably mounted on the first unit.

8. A sheet dispensing mechanism according to claim 1, wherein the second transport mechanism comprises first and second continuous belt arrangements respectively arranged in cooperative relationship with respect to first and second flat smooth surfaces whereby sheets are transported between the continuous belt arrangements and the flat smooth surfaces.

9. An automated teller machine (ATM) comprising:

a housing having a currency dispensing port via which currency is dispensed to an ATM user;

a first unit mounted inside the housing including removable a currency cassette, a picking mechanism for picking currency one by one from the currency cassette, and a first transport mechanism for transporting currency from the picking mechanism; and a second unit which is mounted on the first unit within the housing with a selected orientation relative to the first unit dependent on whether the ATM has a front loading or a rear loading configuration, the second unit being arranged to receive currency transported upwardly out of the first unit, and including a second transport mechanism for transporting individual currency notes received from the first unit to a stacking mechanism where the currency notes are stacked into a bunch, and further including a bunch transport mechanism for transporting the bunch of currency notes from the stacking mechanism to the currency dispensing port through which the bunch is presented for collection by an ATM user;

the first unit including a currency validator through which currency transported from the picking mechanism by the first transport mechanism are passed, a first divert mechanism for directing currency rejected by currency validator into a first reject mechanism, and third transport mechanism for transporting currency accepted by the currency validator upwardly out of the first unit to the second unit at a single transfer station, regardless of whether the ATM has a front or rear loading configuration.

10. An ATM according to claim 9, wherein the third transport mechanism is arranged to transport sheets out of the first unit in a vertical direction.

11. An ATM according to claim 10, wherein (i) the first unit is provided with first and second locating means and (ii) the second unit is provided with third and fourth locating means which are arranged to cooperate with the first and second locating means for the purpose of locating the second unit relatively to the first unit, the first and second locating means and the third and fourth locating means being symmetrically positioned with respect to the vertical feed path of sheets out of the first unit.

12. An ATM according to claim 11, further comprising a second reject mechanism for receiving any presented bunch which is not taken by an ATM user within a predetermined period of time and which is transported into the second reject mechanism by the bunch transport mechanism and the second transport mechanism.

13. An ATM according to claim 12, wherein the second unit further includes a second divert mechanism arranged to direct a bunch of currency notes into the second reject mechanism.

14. An ATM according to claim 12, wherein the first and second reject mechanisms are respectively formed by compartments of a simple, composite reject mechanism which is detachable from the ATM.

15. An ATM according to claim 9, wherein the second unit is detachably mounted on the first unit.

16. An ATM according to claim 9, wherein the second transport mechanism comprises first and second continuous belt arrangements respectively arranged in cooperative relationship with respect to first and second flat smooth surfaces whereby currency notes are transported between the continuous belt arrangements and the flat smooth surfaces.

* * * * *